United States Patent
Ou et al.

(10) Patent No.: US 8,005,318 B2
(45) Date of Patent: Aug. 23, 2011

(54) WEIGHT-ADJUSTED MODULE AND METHOD

(75) Inventors: Tse-Hua Ou, Taipei (TW); Sheng-Che Tsao, Taipei (TW)

(73) Assignee: Via Technologies, Inc., Taipei (TW)

( * ) Notice: Subject to any disclaimer, the term of this patent is extended or adjusted under 35 U.S.C. 154(b) by 1100 days.

(21) Appl. No.: 11/812,338

(22) Filed: Jun. 18, 2007

(65) Prior Publication Data
US 2008/0025644 A1 Jan. 31, 2008

(30) Foreign Application Priority Data

Jul. 28, 2006 (TW) ............................ 95127903 A

(51) Int. Cl.
*G06K 9/32* (2006.01)
(52) U.S. Cl. ........ 382/298; 382/159; 382/167; 382/197; 382/199; 382/300; 382/240
(58) Field of Classification Search .................... 382/298
See application file for complete search history.

(56) References Cited

U.S. PATENT DOCUMENTS

| | | | | |
|---|---|---|---|---|
| 4,573,070 A | * | 2/1986 | Cooper | 348/617 |
| 4,644,583 A | * | 2/1987 | Watanabe et al. | 382/199 |
| 4,908,872 A | * | 3/1990 | Toriu et al. | 382/197 |
| 5,054,100 A | * | 10/1991 | Tai | 382/300 |
| 5,418,899 A | * | 5/1995 | Aoki et al. | 345/668 |
| 5,446,804 A | * | 8/1995 | Allebach et al. | 382/298 |
| 6,226,414 B1 | * | 5/2001 | Go | 382/240 |
| 6,307,569 B1 | | 10/2001 | Ratakonda | |
| 6,618,097 B1 | * | 9/2003 | Yamada | 348/625 |
| 7,570,809 B1 | * | 8/2009 | Srinivasa | 382/167 |
| 2005/0041871 A1 | | 2/2005 | Abe | |
| 2005/0140829 A1 | * | 6/2005 | Uchida et al. | 348/625 |

FOREIGN PATENT DOCUMENTS

TW 200522719 12/1992

* cited by examiner

*Primary Examiner* — Vu Le
*Assistant Examiner* — Tsung-Yin Tsai
(74) *Attorney, Agent, or Firm* — Birch, Stewart, Kolasch & Birch, LLP

(57) ABSTRACT

A weight-adjusted method applied in adjusting a weighting coefficient in an image scaling process. First, an absolute difference is obtained by taking an absolute value of a difference between a first pixel value and a second pixel value of an image. Next, the absolute difference is compared with several threshold values, which define several zones, so as to generate a weight-adjusted value corresponding to a zone in which the absolute difference falls. After that, a first pixel weighted value and a second pixel weighted value are adjusted according to the weight-adjusted value. Finally, a weighted pixel value is outputted by adding a product of the first pixel value and a first adjusted pixel weighted value to a product of the second pixel value and a second adjusted pixel weighted value.

6 Claims, 3 Drawing Sheets

WEIGHT-ADJUSTED MODULE AND METHOD

BACKGROUND OF THE INVENTION

1. Field of Invention

The invention relates to a weight-adjusted method, and, in particular, to a method for adjusting a weighting coefficient in the image scaling process.

2. Related Art

With the coming of the information and video/audio ages, various kinds of image processing technologies are well developed. Among the image processing technologies, the image scaling process is widely used to scale up or down an image for the subsequent image displaying according to user's requirements. The conventional method of scaling up or down the image will be described in the following.

Typically, an image is composed of a plurality of pixel rows, each of which includes a plurality of pixels. Each of the pixels may be represented by a pixel value. In a full-color mode, for example, each pixel may be represented by red, green and blue primary colors. Thus, the pixel value of each pixel is composed of the red color data, green color data and blue color data, and 6 bits are used to store the red color data, green color data and blue color data. That is, each of the red color data, green color data and blue color data is stored by 2 bits. The pixel displays the desired color according to the pixel value. For example, if 2 bits of the pixel value corresponding to the red color data are larger, the pixel will show the color much approaching to red color. On the contrary, if the 2 bits of the pixel value corresponding to the red color data are smaller, the pixel will show the color much approaching to white. Similarly, the pixel shows the green color and blue color by the same way. When the image is to be scaled up in the prior art, additional pixel rows are generated by way of interpolation according to the original pixel rows. The interpolation is performed according to the following Equation 1.

$$Yi = RA \times Ai + RB \times Bi \quad \text{(Equation 1)}$$

In Equation 1, $Yi$ denotes the $i^{th}$ pixel value of the pixel row generated after the interpolation processing, $Ai$ and $Bi$ denote two $i^{th}$ pixel values in adjacent two original pixel rows required for the interpolation processing, and the same weighting coefficient $RA$ and the same weighting coefficient $RB$ are used in equation 1 to calculate all pixel values in the generated pixel row. The two original pixel rows and the weighting coefficients $RA$ and $RB$ required in equation 1 are determined according to the pixel row number C (or the location) of the generated pixel row and the desired scale ratio S. For example, the pixel row number C minus 1 is multiplied by an inverse of the desired scale ratio S to get a product. If the integer portion of the product is N, the two original pixel rows required in equation 1 for the interpolation processing are the original $(N+1)^{th}$ pixel row and $(N+2)^{th}$ pixel row, and $Ai$ and $Bi$ are the $i^{th}$ pixel values in the original $(N+1)^{th}$ pixel row and $(N+2)^{th}$ pixel row, respectively. RA is the proper fraction portion SA/B of the product and RB is (1−SA/B).

For example, if the seventh pixel value of the fourth pixel row in the image that is scaled up by 4/3 times is to be obtained, C is 4 and the desired scale ratio S is 4/3. First, C minus 1 leaves 3, and then 3 is multiplied by ¾, which is an inverse of the desired scale ratio S, to get 2¼. The integer portion N of the product is 2 and the proper fraction portion SA/B thereof is ¼. Thus, RA is ¼ and RB is ¾. Then, the product of ¼ and the $i^{th}$ pixel value in the original third pixel row is added to the product of ¾ and the $i^{th}$ pixel value in the original fourth pixel row to obtain the scaled up $i^{th}$ pixel value in the fourth pixel row. In a similar manner, each pixel value in the fourth pixel row or the scale-up image may be obtained. When the original image includes 15 pixel rows, the original image may be scaled up by 4/3 times according to this interpolation method to get the scale-up image having 20 pixel rows. In addition, according to similar calculating steps, the original image can be scaled down by the desired scale ratio, which is set to be a fraction smaller than 1. For example, the image can be scaled down by two if the ratio is set to be ½. The calculating steps for obtaining the scale-down image are similar to those for obtaining the scale-up image, so the detailed description will be omitted.

However, if the original image has adjacent pixels with large contrast, such as the pixels located between the edge of the objective and the background, the edge of the objective in the frame may become blurred or unsharp according to the conventional image scaling method. Accordingly, the image quality is deteriorated. For example, when an image shows a black objective with the white background, the conventional image scaling method makes the edge of the objective become gray after processing. The gray edge of the objective between the processed white background and the processed black objective results in the vague image. Thus, it is an important subject of the invention to provide a weight-adjusted module and a method thereof capable of solving the above-mentioned problems.

SUMMARY OF THE INVENTION

In view of the foregoing, the invention is to provide a weight-adjusted module and method capable of adjusting the weighting coefficients according to the image property.

To achieve the above, the invention discloses a weight-adjusted module for adjusting a weighting coefficient in the image scaling process. The weight-adjusted module includes an operating unit and an adjusting unit. The operating unit firstly takes an absolute value of a difference between a first pixel value and a second pixel value of an image to obtain an absolute difference, compares the absolute difference with several threshold values, which define several zones, and then outputs a weight-adjusted value corresponding to a zone in which the absolute difference falls. Finally, the adjusting unit adjusts a first pixel weighted value and a second pixel weighted value according to the weight-adjusted value.

To achieve the above, the invention also discloses a weight-adjusted method for adjusting a weighting coefficient in the image scaling process. The weight-adjusted method firstly takes an absolute value of a difference between a first pixel value and a second pixel value of an image to obtain an absolute difference. Next, the absolute difference is compared with several threshold values, which define several zones, so as to generate a weight-adjusted value corresponding to a zone in which the absolute difference falls is outputted accordingly. Finally, a first pixel weighted value and a second pixel weighted value are adjusted according to the weight-adjusted value.

As mentioned above, the weight-adjusted module and method of the invention can adjust the first and second pixel weighted values according to the difference between the first and second pixel values. Thus, the pixel values generated in the image scaling processing can be adjusted properly based on the image property. Accordingly, the scale-up or scale-down image after the image scaling processing can avoid the edge blurring of the objective and remain sharp, so that the quality of the image can be improved.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
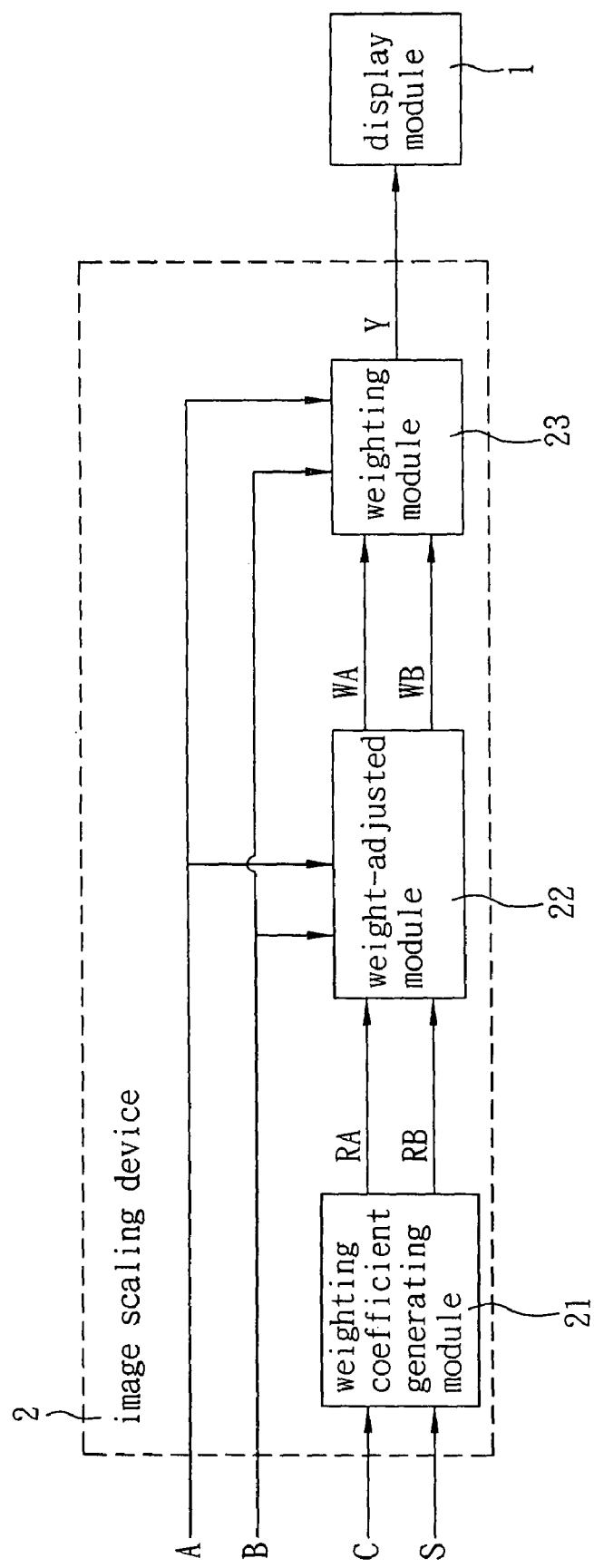
FIG. 1 is a block diagram showing an image scaling device according to an embodiment of the invention.

FIG. 1 shows an image scaling device 2, which scales an image composed of a plurality of pixels, according to the embodiment of the invention. The image scaling device 2 includes a weighting coefficient generating module 21, a weight-adjusted module 22 and a weighting module 23. The weighting coefficient generating module 21, the weight-adjusted module 22 and the weighting module 23 may be implemented by digital logic circuits. The weight-adjusted module 22 is connected to the weighting coefficient generating module 21 and the weighting module 23. The weighting coefficient generating module 21 firstly generates a first weighted value RA and a second weighted value RB according to a desired scale ratio S and a pixel row number C indicating a pixel row, which includes a to-be-generated pixel. Next, according to a difference between a first pixel value A and a second pixel value B, the weight-adjusted module 22 respectively adjusts the first weighted value RA and the second weighted value RB so as to generate a first adjusted pixel weighted value WA and a second adjusted pixel weighted value WB. The first pixel value A and the second pixel value B are respectively the pixel values of a first pixel and a second pixel, which are adjacent to each other and are disposed in two adjacent pixel rows. Finally, the weighting module 23 adds a product of the first pixel value A and the first adjusted pixel weighted value WA to a product of the second pixel value B and the second adjusted pixel weighted value WB to obtain a weighted pixel value Y. The weighted pixel value Y is then outputted to a display module 1 for displaying.

Figure 2:
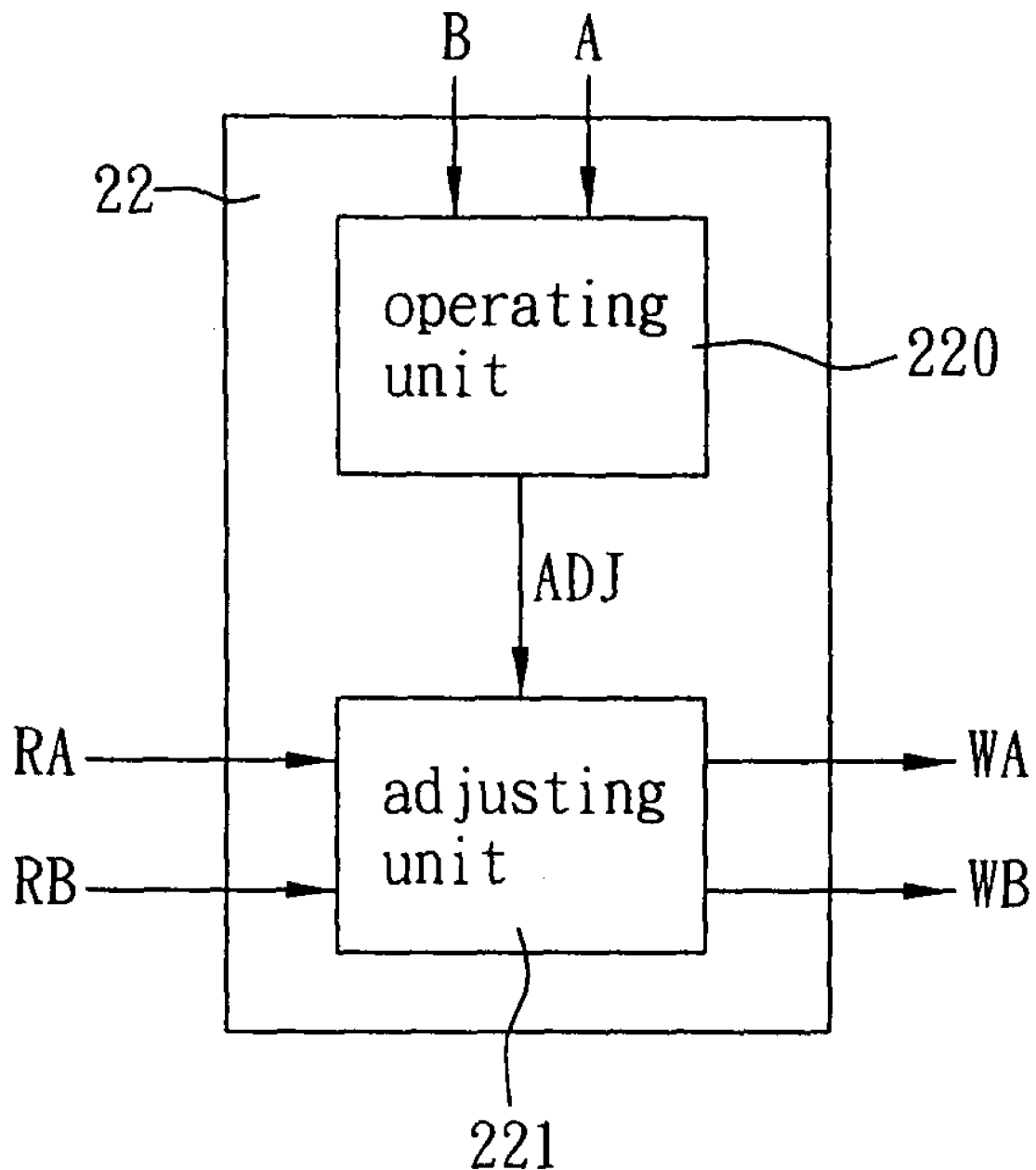
FIG. 2 is a block diagram showing a weight-adjusted module according to the embodiment of the invention.

Referring to FIG. 2, the weight-adjusted module 22 includes an operating unit 220 and an adjusting unit 221. The operating unit 220 calculates a difference between the first pixel value A and the second pixel value B. The difference may be a brightness difference or a chroma difference. Next, an absolute difference DIF is obtained by taking an absolute value of the difference and then compared with several threshold values. Finally, a zone in which the absolute difference falls may be obtained to judge the level of the brightness or chroma difference between the first pixel value A and the second pixel value B. Consequently, the operating unit 220 outputs a weight-adjusted value ADJ corresponding to the zone in which the absolute difference falls according to the comparison result. Herein, the zone is defined by the threshold values.

For example, these threshold values may include a first threshold value THR1 and a second threshold value THR2, or even more threshold values, wherein the first threshold value THR1 is greater than the second threshold value THR2. As shown in Equation 2, the weight-adjusted value ADJ is set as a first value D1 when the operating unit 220 determines that the absolute difference DIF is greater than the first threshold value THR1 by way of comparison, the weight-adjusted value ADJ is set as a second value D2 when the operating unit 220 determines that the absolute difference DIF is between the first threshold value THR1 and the second threshold value THR2, or the weight-adjusted value ADJ is set as 0 when the operating unit 220 determines that the absolute difference DIF is smaller than the second threshold value THR2.

$$\begin{aligned}&\text{If DIF} > \text{THR1}\\&\text{DJ=D1}\\&\text{Else if THR1} > \text{DIF} > \text{THR2}\\&\text{ADJ=D2}\\&\text{Else if THR2} > \text{DIF}\\&\text{ADJ=0}\end{aligned} \quad \text{(Equation 2)}$$

Next, the adjusting unit 221 receives the weight-adjusted value ADJ to set a weighting coefficient calibrating value D, which is used to adjust the first weighted value RA and the second weighted value RB. The adjusting unit 221 performs the following processes to set the weighting coefficient calibrating value D. First, the adjusting unit 221 compares the first weighted value RA with the second weighted value RB and selects a smaller one of the first weighted value RA and the second weighted value RB as a reference base value Wm. Next, the adjusting unit 221 sets the weighting coefficient calibrating value D according to the weight-adjusted value ADJ. When the weight-adjusted value ADJ is equal to the first value D1, the adjusting unit 221 sets the weighting coefficient calibrating value D as the reference base value Wm. When the weight-adjusted value ADJ is equal to the second value D2, the adjusting unit 221 sets the weighting coefficient calibrating value D as one half of the reference base value Wm. When the weight-adjusted value ADJ is equal to 0, the adjusting unit 221 sets the weighting coefficient calibrating value D as zero. The weight-adjusted value ADJ can be obtained referring to Equation 3:

$$\begin{aligned}&\text{If ADJ=D1}\\&\text{D=Wm}\\&\text{Else if ADJ=D2}\\&\text{D=Wm/2}\\&\text{Else if ADJ=0}\\&\text{D=0}\end{aligned} \quad \text{(Equation 3)}$$

Then, the adjusting unit 221 adds the first weighted value RA to the weighting coefficient calibrating value D to obtain the first adjusted pixel weighted value WA, and subtracts the weighting coefficient calibrating value D from the second weighted value RB to obtain the second adjusted pixel weighted value WB, as shown in Equations 4 and 5.

$$WA = RA + D \quad \text{(Equation 4)}$$

$$WB = RB - D \quad \text{(Equation 5)}$$

In addition, the weighting coefficient calibrating value can be set according to the weight-adjusted value ADJ. When the difference between the first pixel value A and the second pixel value B is larger, the weighting coefficient calibrating value D is set to be the same as the reference base value Wm, or one half of the reference base value Wm. Thus, the weights with corresponding to the first adjusted pixel weighted value WA and the second adjusted pixel weighted value WB in generating the weighted pixel values Y can be increased or decreased as desired. Finally, after the first weighted value RA and the second weighted value RB are adjusted, the adjusting unit 221 outputs the first adjusted pixel weighted value WA and the second adjusted pixel weighted value WB to the weighting module 23, which generates the weighted pixel value Y according to Equation 6.

$$Y = WA \times A + WB \times B \quad \text{(Equation 6)}$$

Regarding to the typical image, if the first pixel and the second pixel are located at two sides of the edge of an objective in the frame, the color change or contrast between the two pixels is usually larger. If the contrast difference between the two pixels is greater than the second threshold value or even greater than the first threshold value, the first pixel weighted value WA or the second pixel weighted value WB will be adjusted. Then, the brightness or chroma of the weighted pixel is closer to the brightness or chroma of the first pixel or the second pixel. Thus, the blurring or unsharp phenomenon caused in the prior art can be avoided. If the first pixel and the second pixel are located in the same objective in the frame, the color change or contrast between the two pixels is usually smaller. If the contrast difference between the two pixels is smaller than the second threshold value, the first pixel weighted value WA or the second pixel weighted value WB will not be adjusted. Because the colors of the first pixel and the second pixel are originally close to each other, the brightness or chroma of the weighted pixel is also close to the first pixel value or the second pixel value. Thus, the processed image looks very natural.

Figure 3:
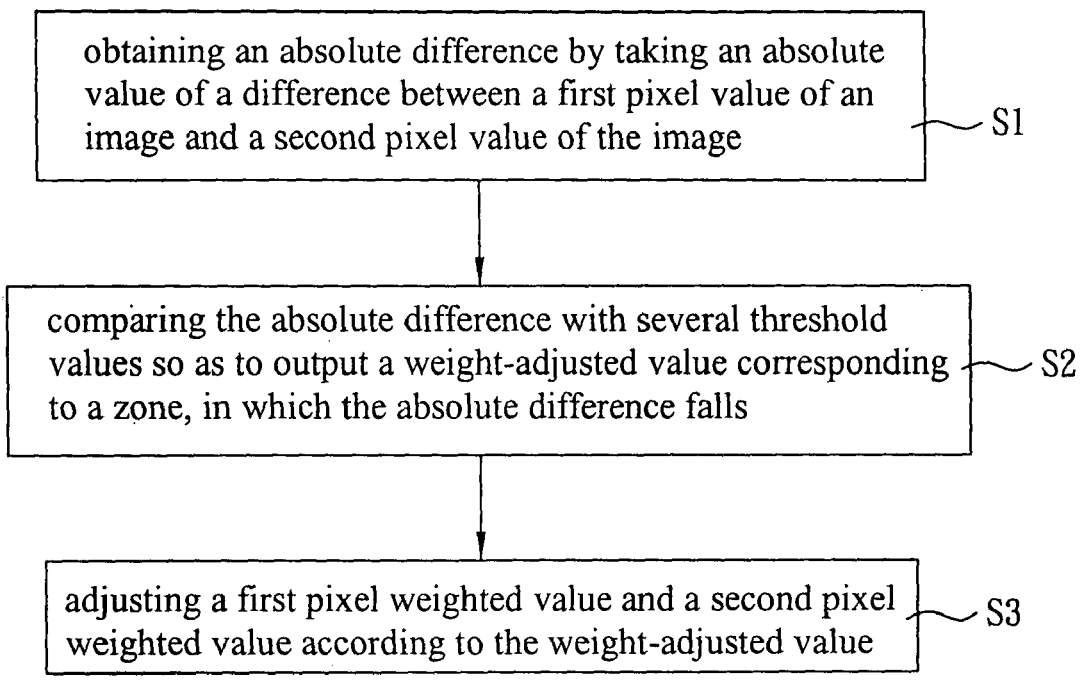
FIG. 3 is a flow chart showing a weight-adjusted method according to the embodiment of the invention.

FIG. 3 is a flow chart showing a weight-adjusted method according to the embodiment of the invention. Referring to FIG. 3, the weight-adjusted method for adjusting the weighting coefficient in the image scaling technology includes steps S1 to S3. In step S1, an absolute difference is obtained by taking an absolute value of a difference between a first pixel value of an image and a second pixel value of the image, wherein the first pixel and the second pixel are adjacent to each other and located in adjacent pixel rows respectively. Next, in step S2, the absolute difference is compared with several threshold values and a weight-adjusted value corresponding to a zone, in which the absolute difference falls, is outputted. The corresponding zone is defined by the threshold values. Then, in step S3, a first pixel weighted value and a second pixel weighted value are adjusted according to the weight-adjusted value. The first pixel weighted value and the second pixel weighted value are generated according to a desired scale ratio of the image and the location of a pixel row in which the generated pixel falls. Finally, the product of the first pixel value and a first adjusted pixel weighted value and the product of the second pixel value and a second adjusted pixel weighted value are added together to output a weighted pixel value.

In the embodiment of the invention, it is possible to add the first pixel weighted value and a weighting coefficient calibrating value together to obtain the first adjusted pixel weighted value, and to subtract the weighting coefficient calibrating value from the second pixel weighted value to obtain the second adjusted pixel weighted value. The weighting coefficient calibrating value is set to be a reference base value, one half of the reference base value or zero according to the weight-adjusted value. The reference base value is obtained by selecting a smaller one of the first pixel weighted value and the second pixel weighted value.

As mentioned above, the weight-adjusted module and method of the invention can adjust the first and second pixel weighted values according to the difference between the first and second pixel values. Thus, the pixel values generated in the image scaling processing can be adjusted properly based on the image property. Accordingly, the scale-up or scale-down image after the image scaling processing can avoid the edge blurring of the objective and remain sharp, so that the quality of the image can be improved.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A weight-adjusted module for adjusting a weighting coefficient in an image scaling process, the weight-adjusted module comprising:

an operating unit for obtaining a difference between a first pixel value of an image and a second pixel value of the image, taking an absolute value of the difference to obtain an absolute difference, and then comparing the absolute difference with a plurality of threshold values to output a weight-adjusted value corresponding to a zone, wherein the absolute difference falls in the zone, and the zone is defined by the threshold values; and an adjusting unit for setting a weighting coefficient calibrating value according to the weight-adjusted value, adding a first pixel weighted value to the weighting coefficient calibrating value to obtain a first adjusted pixel weighted value, and subtracting the weighting coefficient calibrating value from a second pixel weighted value to obtain a second adjusted pixel weighted value, wherein the adjusting unit compares the first pixel weighted value with the second pixel weighted value to select a smaller one of the first pixel weighted value and the second pixel weighted value to serve as a reference base value, and selects the weighting coefficient calibrating value to be the reference base value, a half of the reference base value or zero according to the weight-adjusted value.

2. The module according to claim 1 being connected to a weighting coefficient generating module, wherein the weighting coefficient generating module generates the first pixel weighted value and the second pixel weighted value according to a desired scale ratio of the image and a pixel row, in which a weighted pixel value falls.

3. The module according to claim 1 being connected with a weighting module, wherein the weighting module adds a product of the first pixel value and a first adjusted pixel weighted value to a product of the second pixel value and a second adjusted pixel weighted value to output a weighted pixel value.

4. A weight-adjusted method for adjusting a weighting coefficient in an image scaling process, the method comprising:

taking an absolute value of a difference between a first pixel value of an image and a second pixel value of the image to obtain an absolute difference;

comparing the absolute difference with a plurality of threshold values so as to output a weight-adjusted value corresponding to a zone, in which the absolute difference falls, wherein the zone is defined by the threshold values;

setting a weighting coefficient calibrating value according to the weight-adjusted value;

adding a first pixel weighted value to the weighting coefficient calibrating value to obtain a first adjusted pixel weighted value;

subtracting the weighting coefficient calibrating value from a second pixel weighted value to obtain a second adjusted pixel weighted value;

comparing the first pixel weighted value with the second pixel-weighted value to select a smaller one of the first pixel weighted value and the second pixel weighted value to serve as a reference base value; and selecting the weighting coefficient calibrating value to be the reference base value, a half of the reference base value or zero according to the weight-adjusted value.

5. The method according to claim 4, further comprising:
adding a product of the first pixel value and a first adjusted pixel weighted value to a product of the second pixel value and a second adjusted pixel weighted value to output a weighted pixel value.

6. The method according to claim 4, wherein the step of adjusting the first pixel weighted value and the second pixel weighted value according to the weight-adjusted value is to generate the first pixel weighted value and the second pixel weighted value according to a desired scale ratio of the image and a pixel row, in which a weighted pixel value falls.

* * * * *